United States Patent
Lacombe

(10) Patent No.: US 7,741,819 B2
(45) Date of Patent: *Jun. 22, 2010

(54) UNIPOLAR OR BIPOLAR CHOPPING CONVERTER WITH TWO MAGNETICALLY COUPLED WINDINGS

(75) Inventor: Bertrand Lacombe, Paris (FR)

(73) Assignee: Hispano Suiza, Colombes (FR)

( * ) Notice: Subject to any disclaimer, the term of this patent is extended or adjusted under 35 U.S.C. 154(b) by 102 days.

This patent is subject to a terminal disclaimer.

(21) Appl. No.: 12/026,111

(22) Filed: Feb. 5, 2008

(65) Prior Publication Data
US 2008/0192520 A1 Aug. 14, 2008

(30) Foreign Application Priority Data
Feb. 13, 2007 (FR) ................................. 07 53235

(51) Int. Cl.
*G05F 1/33* (2006.01)
(52) U.S. Cl. .................. 323/250; 323/290; 323/251; 363/59
(58) Field of Classification Search .......... 323/235, 323/239, 240, 250, 251, 284, 290; 363/124, 363/59–61
See application file for complete search history.

(56) References Cited

U.S. PATENT DOCUMENTS

| | | | | | |
|---|---|---|---|---|---|
| 4,896,091 | A | * | 1/1990 | Kislovski | 323/335 |
| 5,477,131 | A | * | 12/1995 | Gegner | 323/254 |
| 6,987,379 | B2 | | 1/2006 | Peron | |
| 2008/0192521 | A1 | * | 8/2008 | Lacombe et al. | 363/124 |

FOREIGN PATENT DOCUMENTS

| | | |
|---|---|---|
| EP | 0 016 537 B1 | 11/1983 |
| EP | 0 913 919 A2 | 5/1999 |
| GB | 2 249 227 A | 4/1992 |

OTHER PUBLICATIONS

U.S. Appl. No. 12/026,199, filed Feb. 5, 2008, Lacombe, et al.

* cited by examiner

*Primary Examiner*—Jessica Han
(74) *Attorney, Agent, or Firm*—Oblon, Spivak, McClelland, Maier & Neustadt, L.L.P.

(57) ABSTRACT

In order to reduce the cost of a chopping converter supplying a continuous voltage at the terminals of a load (Z), a circuit with two windings (Lp, Ls) and a single magnetic core is proposed, according to the present invention, which enables the cost and the size of the circuit to be reduced. It is then necessary to add two diodes (D3, D4) to the circuit, but these elements are inexpensive and of small size.

14 Claims, 25 Drawing Sheets

UNIPOLAR OR BIPOLAR CHOPPING CONVERTER WITH TWO MAGNETICALLY COUPLED WINDINGS

TECHNICAL FIELD

The invention relates to a unipolar or bipolar chopping converter, operating in the quadrants (Is>0; Vs>0) and (Is<0; Vs<0), and with zero output current or voltage, having magnetically coupled windings, which may be configured with the regulation mode adapted in current source or voltage source. It applies to all types of terrestrial, naval or aerial equipment using this type of chopping converter, particularly the electromechanical actuator controls of regulating automatons for turbine engines.

STATE OF THE PRIOR ART

The control of electrical actuators with an RL type load (resistor and inductance in series) may be achieved either by application of a regulated voltage at the terminals of the control coil of the actuator, or by a current source, this latter solution often being preferred in severe environments essentially because it enables the power used to control the accessory to be limited.

Chopping current sources may conventionally be grouped together among current sources using the inductance of the load as energy storage element during the chopping operation, with as consequence the application at the terminals of the load, at the chopping frequency, of an alternatively positive and negative voltage, the transitions between these two states ideally being considered as instantaneous, and current sources supplying a continuous current and, consequently, a continuous voltage at the terminals of the load, in which the energy storage element for the chopping is situated on the control card itself.

Chopping current sources using the inductance of the load as energy storage element have the advantage of having a control that is, at first sight, simple. They comprise few or possibly no inductive elements, which leads to a certain saving in the dimensions of the circuit. On the other hand, they have a certain number of disadvantages. They have a high dependency vis-à-vis the value of the inductance of the load: the capability of controlling the instantaneous current in the switches of the current source depends directly on the charge inductance value. The resistance to short circuits between the output terminals of the converter or between any output terminal and earth is very difficult. Indeed, in the event of short circuit of the load, it is not possible, except by adding components, to limit the instantaneous current. Consequently, in practice it is necessary to add an inductance at the output of the converter in order to limit the short circuit current, to add a protection and very rapid cut off device to limit the maximum value of the short circuit current, to add a circuit for demagnetising the output inductance to manage the cut off after the detection of the short circuit at the output, to over-dimension the interfaces (input filtering capacitor) so that they can withstand the short circuit current. Concerning the electromagnetic compatibility aspect (conducted emissions essentially), these converters are difficult to render compatible with aeronautic emission standards, if a high chopping frequency is desired to limit the size of the passive components of the converters, especially if the load is controlled at the end of several meters of cable. The result is a chopping frequency reduced typically to below 10 kHz and an obligation to dimension an output filter (shared mode and differential mode) that will play a prominent role in the stability of the assembly and will have a non negligible size. This type of chopping current source is restricted to high power applications, for which a low chopping frequency is not necessarily a handicap.

For converters supplying a continuous voltage at the terminals of the load, the chopping no longer takes place in the load but the current (or the voltage) is regulated at the output of a chopping converter comprising an inductance storing at least all of the energy transferred to the load and a capacitor is added to smooth out the output voltage. Consequently, the output voltage is virtually continuous at the terminals of the load. There is therefore less difficulty in meeting aeronautic standards for noise emitted in conduction. In the event of short circuit of the load, the current in the converter remains naturally limited. Chopping frequencies exceeding 100 kHz may be envisaged, limited in fact by the efficiency of the converter and the performance of the gate control circuits of switch elements.

FIG. 1a is an electrical diagram of a converter of the prior art supplying a continuous voltage at the terminals of a load. The circuit is supplied by a positive voltage Vp (for example +25V) and a negative voltage Vm (for example −25V) with respect to earth. Il comprises two elements T1 and T2 each comprising two windings magnetically coupled around a magnetic core. The windings of a same element T1 or T2 are wound in opposition as indicated by a point in FIG. 1a. The winding E1 of the element T1 has a first end connected to the voltage Vp through the intermediary of a diode D5 inversely mounted in relation to the voltage Vp, its second end being to earth. The winding E2 of the element T1 has a first end connected to a first terminal of a switch Q3 in which the second terminal is connected to the voltage Vp. The second end of the winding E2 is connected to the output terminal S1P of the circuit. The winding E3 of the element T2 has a first end connected to the voltage Vm through the intermediary of a diode D6 inversely mounted in relation to the voltage Vm, its second end being to earth. The winding E4 of the element T2 has a first end connected to a first terminal of a switch Q4 in which the second terminal is connected to the voltage Vm. The second end of the winding E4 is connected to the output terminal S1P of the circuit. A smoothing capacitor C1 is connected between the output S1P and the earth.

The converter is transformed into current source by the addition of means of measuring the output current, a suitable regulation and modulator. This is shown in FIG. 1b where the load connected to the output of the converter is represented in the form of a resistor Rc and an inductance Lc connected in series. The output current is measured by a measuring means 1 that delivers a representative signal to a first input of a regulation means (or equaliser) 2. A second input Ec of the regulation means 2 receives a set point signal. The output signal of the regulation means 2 is addressed to the input of a modulator 3 that delivers a command signal SQ3 to the switch Q3 and a command signal SQ4 to the switch Q4.

The converter illustrated in FIG. 1a comprises therefore four windings and two magnetic cores, which leads to a relatively high cost and a relatively large size of the circuit.

DESCRIPTION OF THE INVENTION

In order to reduce the cost and the size of a chopping converter supplying a continuous positive, negative or zero voltage at the terminals of a load, a circuit with two windings coupled on a single magnetic core is proposed, according to the present invention. It is then necessary to add two diodes to the circuit, but these elements are of low cost and of low size.

A first subject of the invention consists in a chopping converter supplied by a positive voltage and a negative voltage with respect to earth, and delivering an output voltage between a first output terminal and a second output terminal, comprising two windings wound in opposition around a magnetic core, the number of turns of the second winding being greater than the number of turns of the first winding, the first end of the first winding being connected to a mid point of a first branch connecting the positive voltage to the negative voltage and comprising a first diode and a second diode inversely mounted, the mid point of the first branch being situated between the first diode and the second diode, the second end of the first winding being connected to earth, the first end of the second winding being connected to a mid point of a second branch connecting the positive voltage to the negative voltage, the part of the second branch connecting its mid point to the positive voltage comprising, arranged in series, a first switch forming means and a third diode directly mounted in relation to the positive voltage and together forming a unidirectional switch with direct and inverse blocking capability, the part of the second branch connecting its mid point to the negative voltage comprising, arranged in series, a second switch forming means and a fourth diode directly mounted in relation to the negative voltage and together forming a unidirectional switch with direct and inverse blocking capability, the second end of the second winding being connected to the output terminal.

Advantageously, a smoothing capacitor is connected between the first output terminal of the converter and earth.

Also advantageously, in the second branch connecting the positive voltage to the negative voltage, said arrangement in series consists in arranging the first and second switch forming means on the side of the respective positive or negative voltages and arranging the third and fourth diodes on the side of the mid point of the second branch.

The switch forming means may be chosen among MOS transistors, bipolar transistors and IGBT transistors or any other switch having a bidirectional conduction capability and a direct blocking capability.

The converter may further comprise a means of measuring the output voltage of the converter, said measuring means delivering an output signal representative of the output voltage to a first input of a regulation means in which a second input receives a set point signal, the regulation means delivering a signal supplied to the input of a modulator in which a first output sends a command signal to the first switch forming means and in which a second output sends a command signal to the second switch forming means, the converter being thereby configured in voltage source.

The converter may further comprise a means of measuring the output current (is) of the converter, said measuring means delivering an output signal representative of the output current of the converter to a first input of a regulation means in which a second input receives a set point signal, the regulation means delivering a signal supplied to the input of a modulator in which a first output sends a command signal to the first switch forming means and in which a second output sends a command signal to the second switch forming means, the converter being configured in current source.

The chopping converter according to the invention may equip an electromechanical actuator control, a regulating automaton, a turbine engine or terrestrial, naval or aeronautic equipment.

The chopping converter according to the present invention may operate according to the following methods.

A first method comprises the following steps, for an operating cycle and to pass a negative current in the load:

a first step during which a first switch forming means are open, the fourth diode is conducting, the second switch forming means are closed and the first, second and third diodes are blocked during a first part of the cycle, the converter operating in continuous mode or in discontinuous mode, a second step, following the first step, during which, the first and second switch forming means are open, the second diode is conducting and the first, third and fourth diodes are blocked during a second part of the cycle, this second part of the cycle not ending the cycle if the converter operates in discontinuous mode and ending the cycle if the converter operates in continuous mode, a third step, following the second step if the converter operates in discontinuous mode, during which the first and second switch forming means are open and the first, second, third and fourth diodes are blocked during a third part of the cycle ending at the end of the cycle.

A second method comprises the following steps, for an operating cycle and to pass a positive current in the load:

a first step during which a first switch forming means are closed, the third diode is conducting, the second switch forming means are open and the first, second and fourth diodes are blocked during a first part of the cycle, the converter operating in continuous mode or in discontinuous mode, a second step, following the first step, during which the first diode is conducting, the first and second switch forming means are open and the second, third and fourth diodes are blocked during a second part of the cycle, this second part of the cycle not ending the cycle if the converter operates in discontinuous mode and ending the cycle if the converter operates in continuous mode, a third step, following the second step if the converter operates in discontinuous mode, during which the first and second switch forming means are open, the first, second, third and fourth diodes are blocked, during a third part of the cycle ending at the end of the cycle.

A third method comprises the following steps, for an operating cycle and to pass a negative current in the load, the converter operating in continuous mode:

a first step during which a first switch forming means are closed, the third diode is conducting, the second switch forming means are open and the first and fourth diodes are blocked, the second diode being blocked if the voltage at the first output with respect to earth is, in absolute value, sufficiently low, during a first part of the cycle, a second step, following the first step, during which the first diode is conducting, the first and second switch forming means are open and the second, third and fourth diodes are blocked during a second part of the cycle, a third step, following the second step, during which the second switch forming means are closed, the fourth diode is conducting, a first switch forming means are open and the first, second and third diodes are blocked, during a third part of the cycle, a fourth step, following the third step, during which the second diode is conducting, the first and second switch forming means are open and the first, third and fourth diodes are blocked, during a fourth part of the cycle ending at the end of the cycle.

A fourth method comprises the following steps, for an operating cycle and to pass a positive current in the load, the converter operating in continuous mode:

a first step during which a first switch forming means are closed, the third diode is conducting, the second switch forming means are open and the first, second and fourth diodes are blocked during a first part of the cycle, a second step, following the first step, during which the first diode is conducting, the first and second switch forming means are open and the second, third and fourth diodes are blocked during a second part of the cycle, a third step, following the second step, during which the second switch forming means are closed, the fourth diode is conducting, a first switch forming means are open and the second and third diodes are blocked, the first diode is blocked if the voltage at the first output with respect to earth is, in absolute value, sufficiently low, during a third part of the cycle, a fourth step, following the third step, during which the second diode is conducting, the first and second switch forming means are open and the first, third and fourth diodes are blocked, during a fourth part of the cycle ending at the end of the cycle.

BRIEF DESCRIPTION OF DRAWINGS

The present invention may best be understood and other advantages and particularities will become apparent by reference to the following description, provided as an indication only and in no way limiting and by referring to the accompanying drawings in which.

DETAILED DESCRIPTION OF AN EMBODIMENT OF THE INVENTION

Figure 1A:
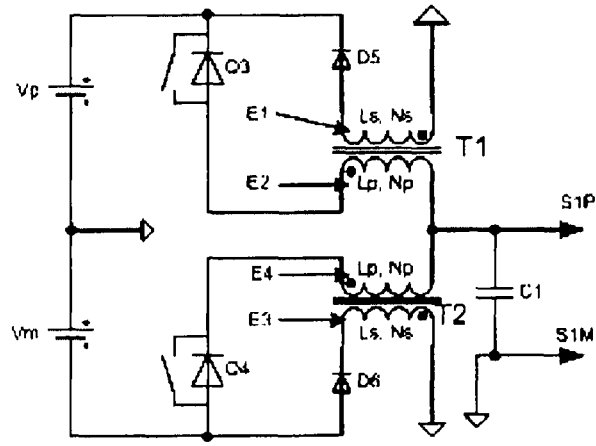
FIG. 1a is an electrical diagram of a chopping converter of the prior art supplying a continuous voltage at the terminals of a load.
Figure 1B:
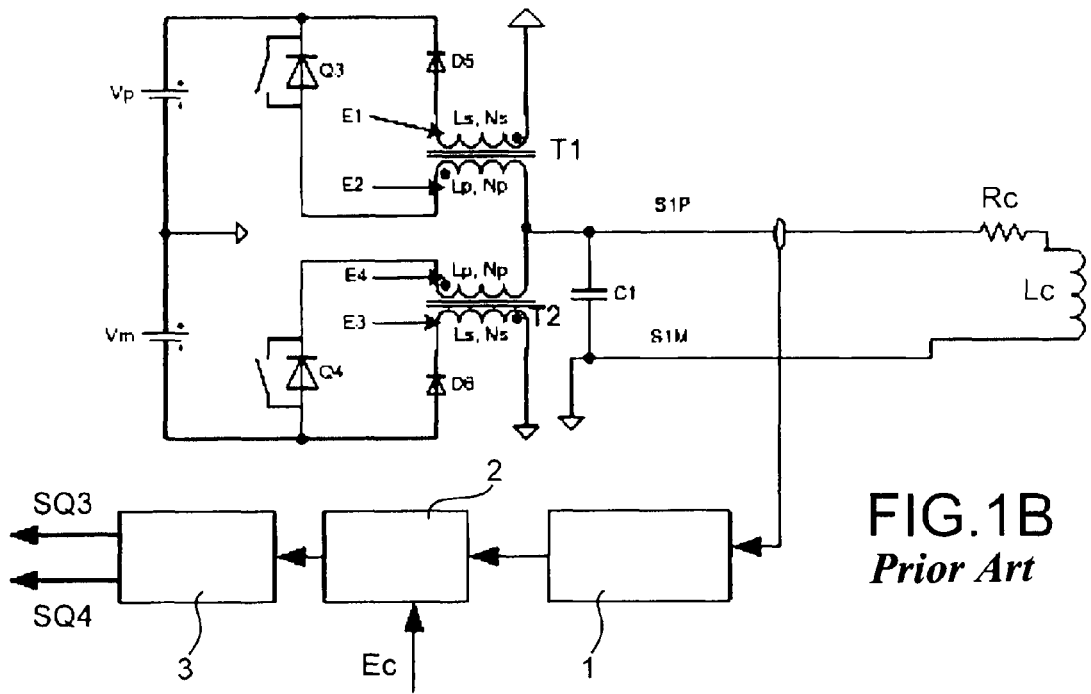
FIG. 1b is an electrical diagram of the converter of FIG. 1a used as chopping current source by addition of means of measuring the output current, as well as suitable equaliser and modulator.
Figure 2:
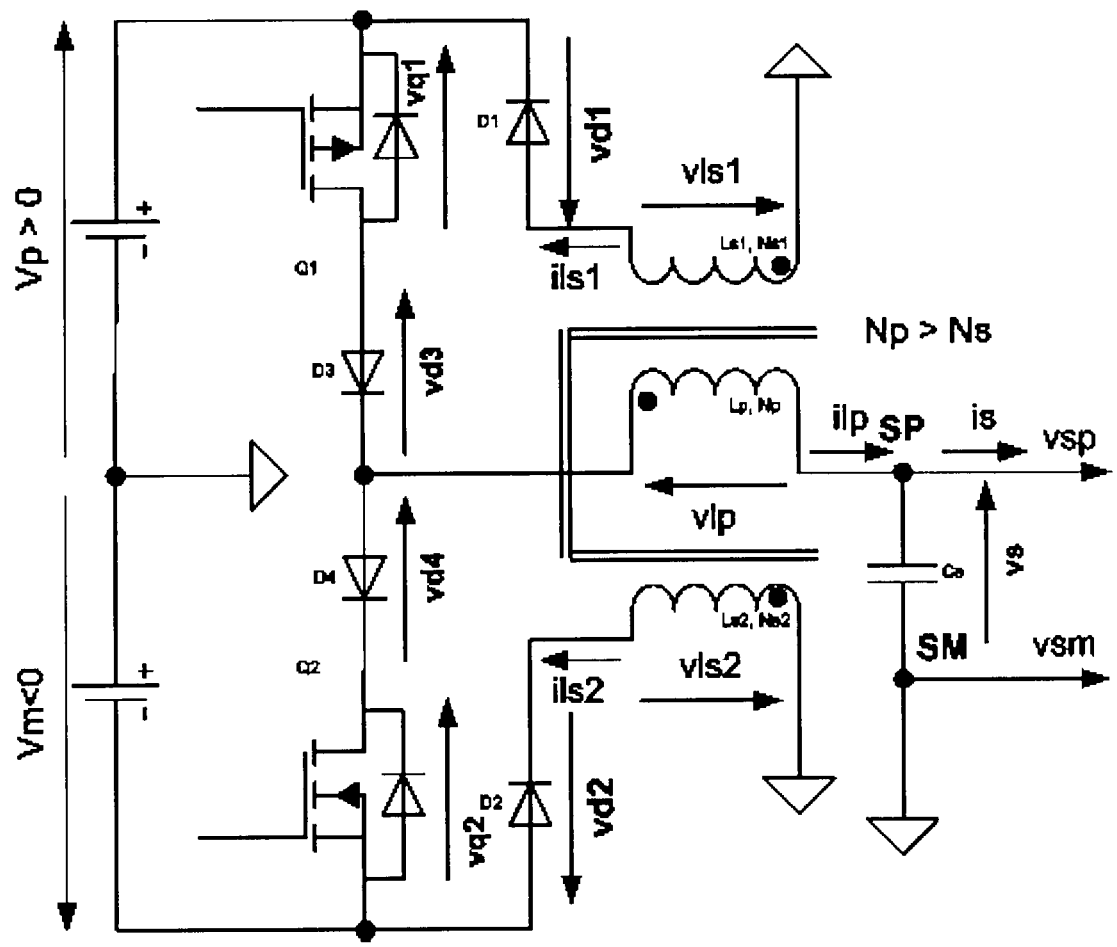
FIG. 2 is an electrical diagram of a chopping converter supplying a continuous voltage at the terminals of a load and that has led to the development of the present invention.

FIG. 2 is an electrical diagram of a chopping converter supplying a continuous voltage at the terminals of a load, and that has led to the development of the present invention. This converter may be, in the same way as for the converter described in FIGS. 1a and 1b, converted into chopping current source by the addition of a means (direct or indirect) of measuring the current of the load and suitable equaliser and modulator. As for FIG. 1a, the circuit is supplied by a positive voltage Vp (for example +25V) and a negative voltage Vm (for example −25V) with respect to earth. It comprises a transformer forming element and comprising three windings Lp, Ls1 and Ls2 wound around a unique magnetic core. The winding direction is indicated by a point in FIG. 2. The windings Ls1 and Ls2 are mounted in series to constitute the secondary of the transformer forming element, their shared point (their first ends) being to earth. The winding Lp constitutes the primary of the transformer forming element. The second end of the winding Ls1 is connected to the voltage Vp through the intermediary of a diode D1 inversely mounted in relation to the voltage Vp. The second end of the winding Ls2 is connected to the voltage Vm through the intermediary of a diode D2 inversely mounted in relation to the voltage Vm. The winding Lp has a first end connected to the cathode of a diode D3 and to the anode of a diode D4. The second end of the winding Lp is connected to the output terminal SP of the circuit. A first terminal of a switch Q1 is connected to the anode of the diode D3 and its second terminal is connected to the voltage Vp. A first terminal of a switch Q2 is connected to the cathode of the diode D4 and its second terminal is connected to the voltage Vm. A smoothing capacitor Cs is connected between the output SP and earth. The output SM may be connected to mechanical earth directly, or via a resistor, depending on the needs of the user.

The switches Q1 and Q2 are advantageously N-channel or P-channel MOSFET transistor elements, depending on the needs of the user. They may be replaced by any other switch having a bi-directional conduction capability and a direct blocking capability.

Np being the number of turns of the winding Lp, Ns1 being the number of turns of the winding Ls1 and Ns2 being the number of turns of the winding Ls2, Np is greater than Ns1 and Ns2, for example Ns1=Ns2=0.75 Np.

FIG. 2 mentions the following voltages:

vq1 at the terminals of Q1, vq2 at the terminals of Q2, vd1 at the terminals of D1, vd2 at the terminals of D2, vd3 at the terminals of D3, vd4 at the terminals of D4, vls1 at the terminals of Ls1, vls2 at the terminals of Ls2, vlp at the terminals of Lp, and vs at the terminals of Cs, i.e. the output voltage of the converter.

FIG. 2 also mentions the following currents:

ils1 flowing through the winding Ls1, ils2 flowing through the winding Ls2, ilp flowing through the winding Lp, and is flowing through the load Z of the converter, i.e. the output current.

Figure 3:
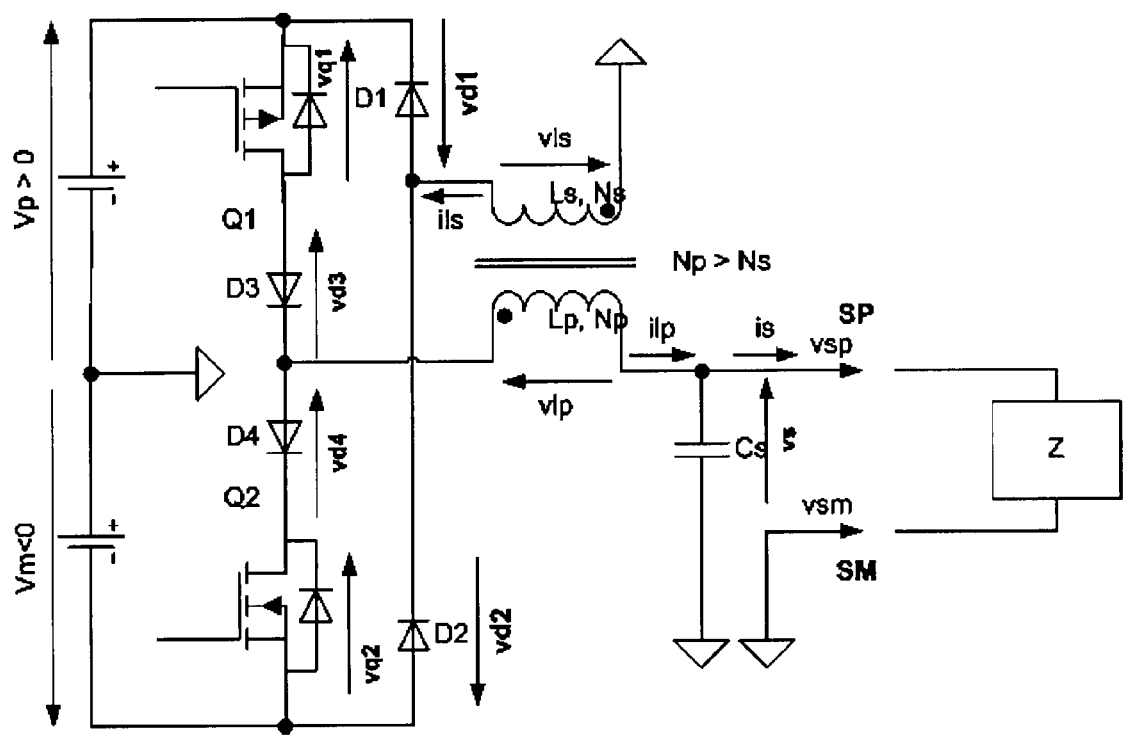
FIG. 3 is an electrical diagram of a chopping converter supplying a continuous voltage at the terminals of a load, according to the invention.

The current source of FIG. 2 has a certain advantage compared to the current source of the prior art illustrated in FIG. 1a. A reading of measurements carried out on an assembly such as shown in FIG. 2 has made it possible to observe that, in an unexpected manner, the anode of the diode D1 and the cathode of the diode D2 were always at the same potential. These two points have therefore been electrically connected and one of the secondary windings has been deleted. This is shown in FIG. 3 where the remaining secondary winding is known as Ls, its number of turns is such that Ns is less than the number of turns Np of the primary winding Lp. FIG. 3 shows a load Z connected at the output of the converter.

The operation of the chopping converter will now be explained in reference to FIGS. 4A to 4N as a function of the commands (closing, opening) sent to the switches Q1 and Q2. In these figures, the currents that flow in the circuit are indicated by bold lines. As will be seen, the converter according to the invention is a two quadrant converter:

(vs>0, is>0) and (vs<0, is<0).

FIGS. 4A to 4F concern an operating mode where a single transistor Q1 or Q2 (forming switch) conducts when the output current is positive (is>0) or when the output current is negative (is<0).

Figure 4A:
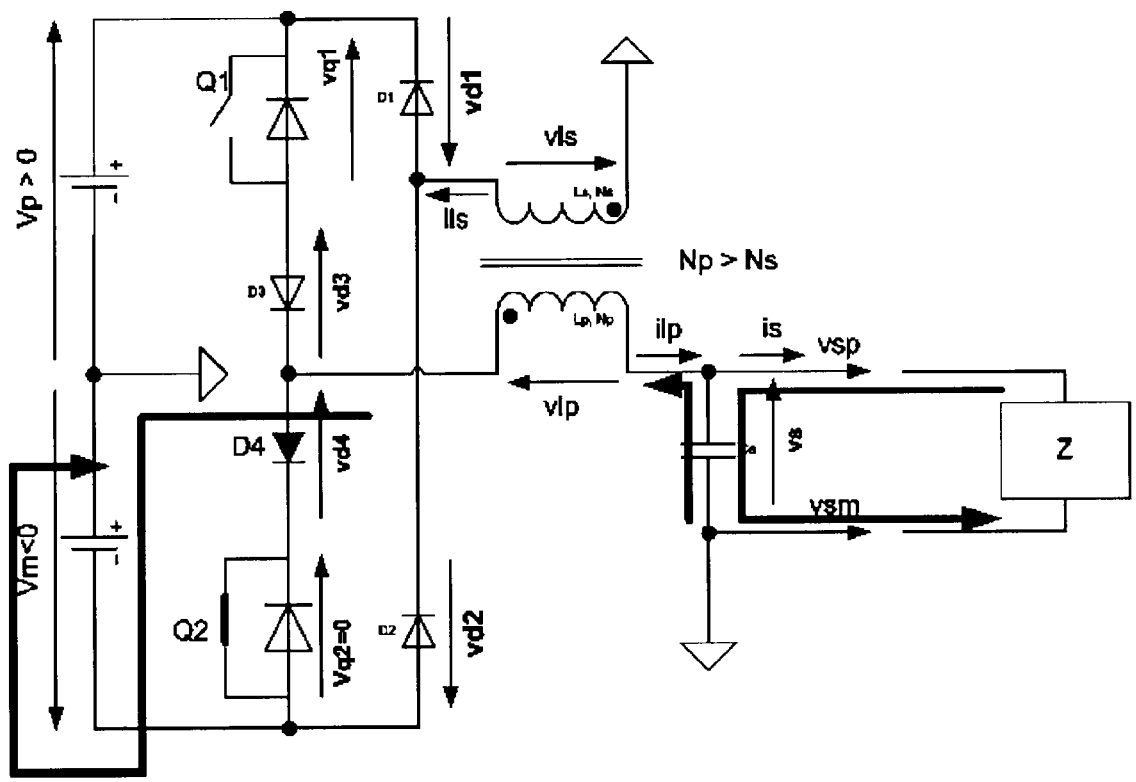
FIGS. 4A to 4N illustrate the operating mode of the present invention.
Figure 4B:
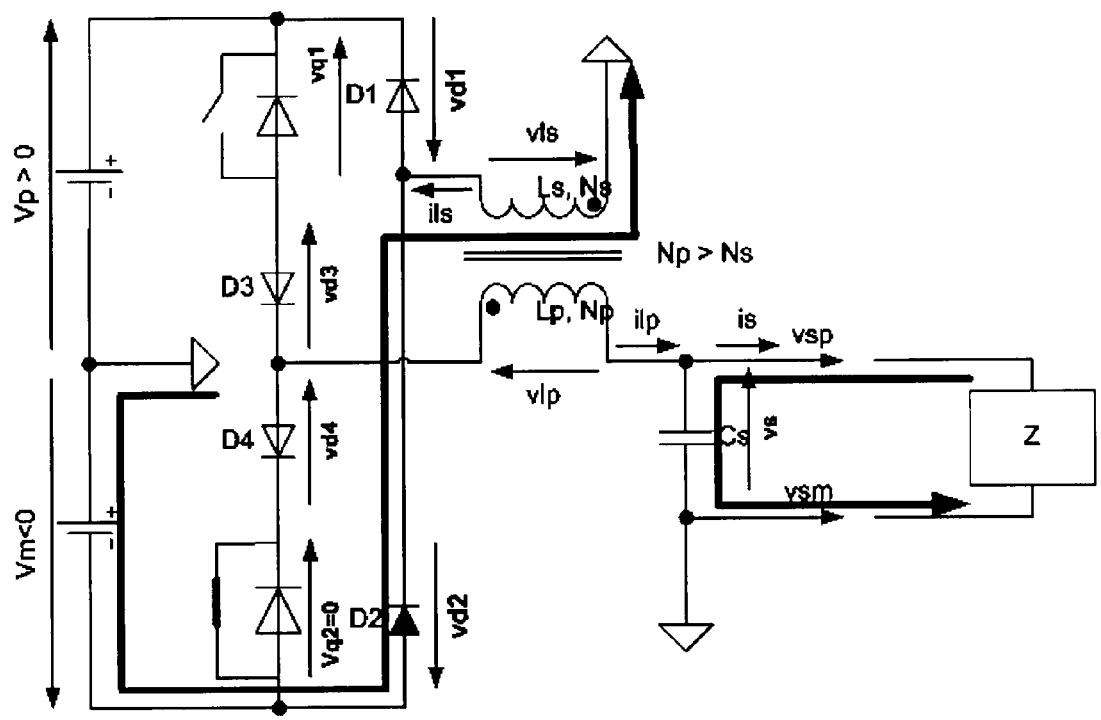
Figure 4C:
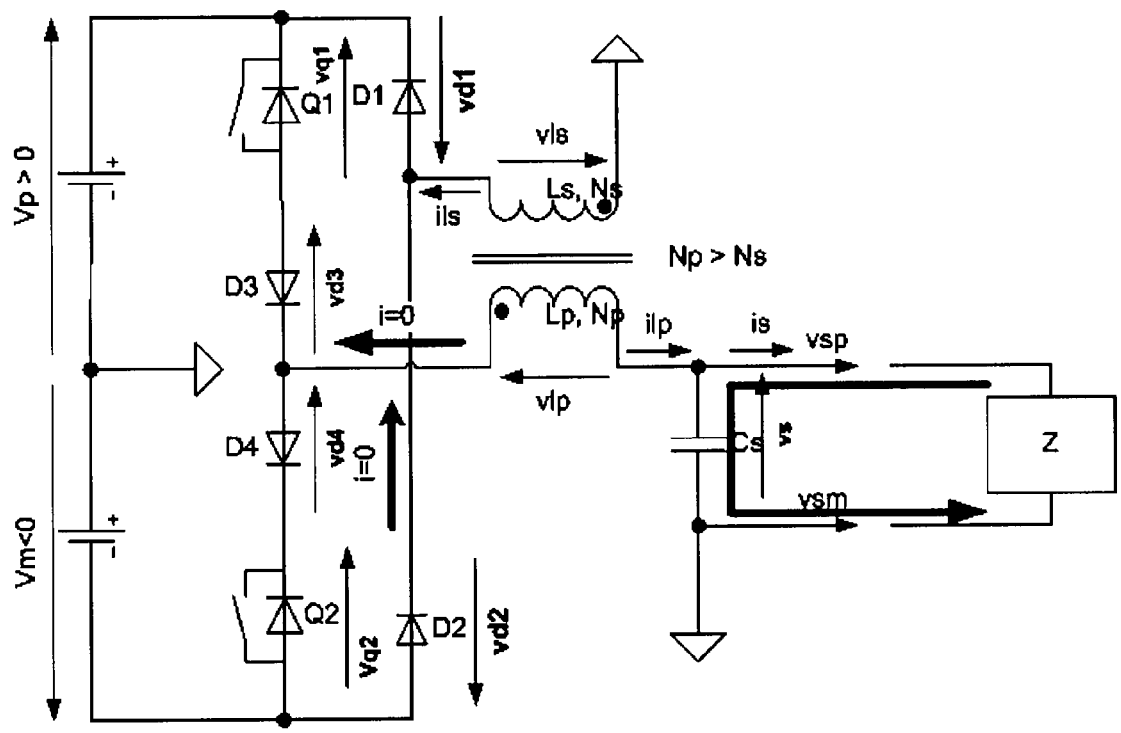

FIGS. 4A to 4C concern an operating mode where the output current "is" is negative, for an operating cycle (from t=0 to t=T).

FIG. 4A illustrates a first step of the operating cycle between the instants t=0 and t=$t_1$ (where $t_1$<T). The circuit may operate in continuous mode and in discontinuous mode. During this step, the command of the circuit is such that:
Q2 and D4 conduct,
Q1, D1, D2 and D3 are blocked.

FIG. 4B illustrates a second step of the operating cycle, between the instants t=$t_1$ and t=$t_2$. The circuit may operate in continuous mode (in this case $t_2$=T) or in discontinuous mode. During this step, the command of the circuit is such that:
D2 conducts,
Q1, Q2, D1, D3 and D4 are blocked.

FIG. 4C illustrates a third step of the operating cycle, uniquely for the discontinuous mode, between t=$t_2$ and t=T. During this step, the command of the circuit is such that:
Q1, Q2, D1, D2, D3 and D4 are blocked,
the current "is" flowing in the load is supplied by the energy accumulated in the capacitor Cs.

Figure 5A:
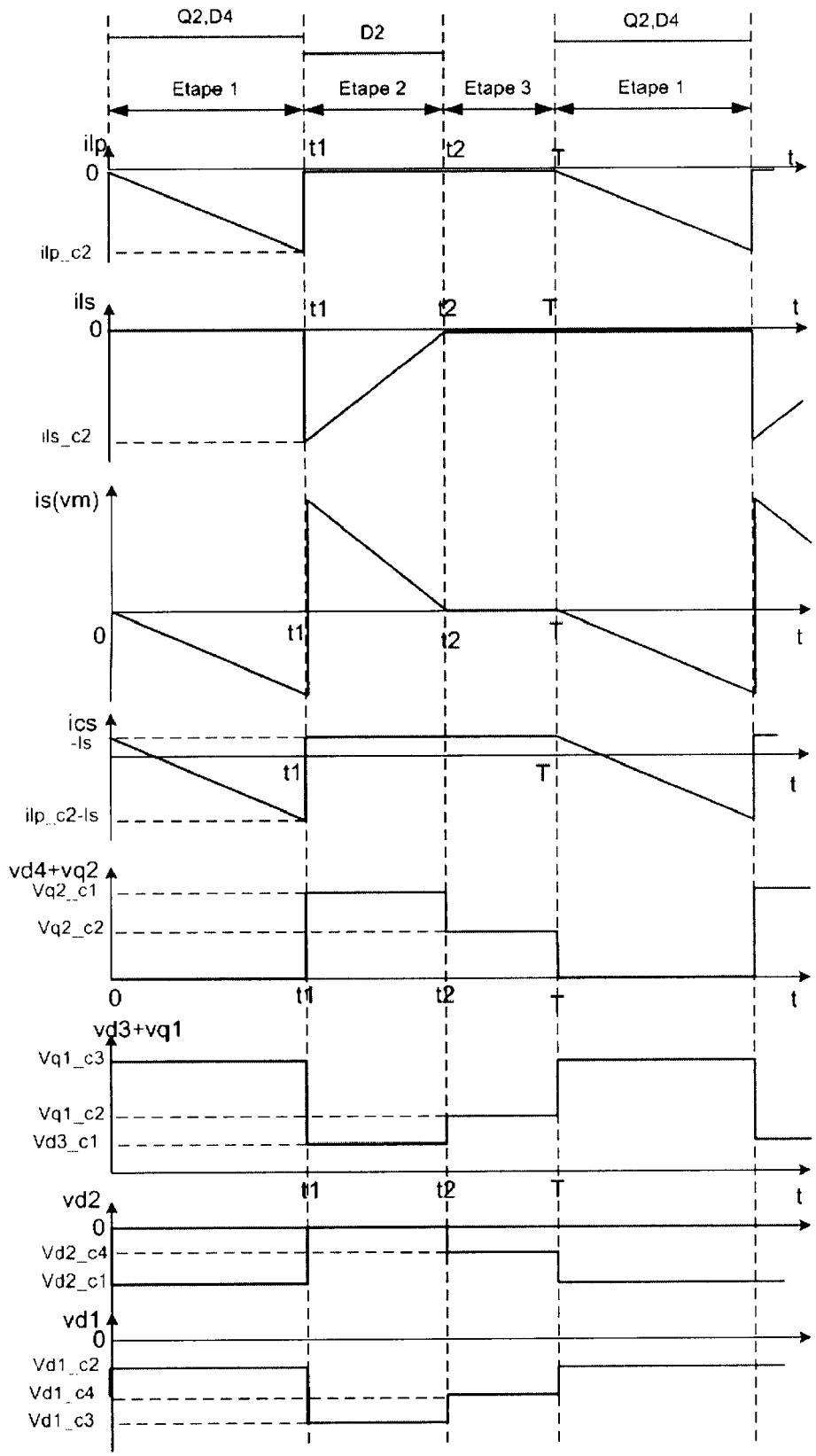
FIGS. 5A to 5F are chronograms corresponding to different operating modes illustrated by FIGS. 4A to 4N.

FIG. 5A shows the chronograms corresponding to the operating mode illustrated by FIGS. 4A to 4C for a discontinuous mode, therefore for an operating cycle comprising three steps.

Figure 5B:
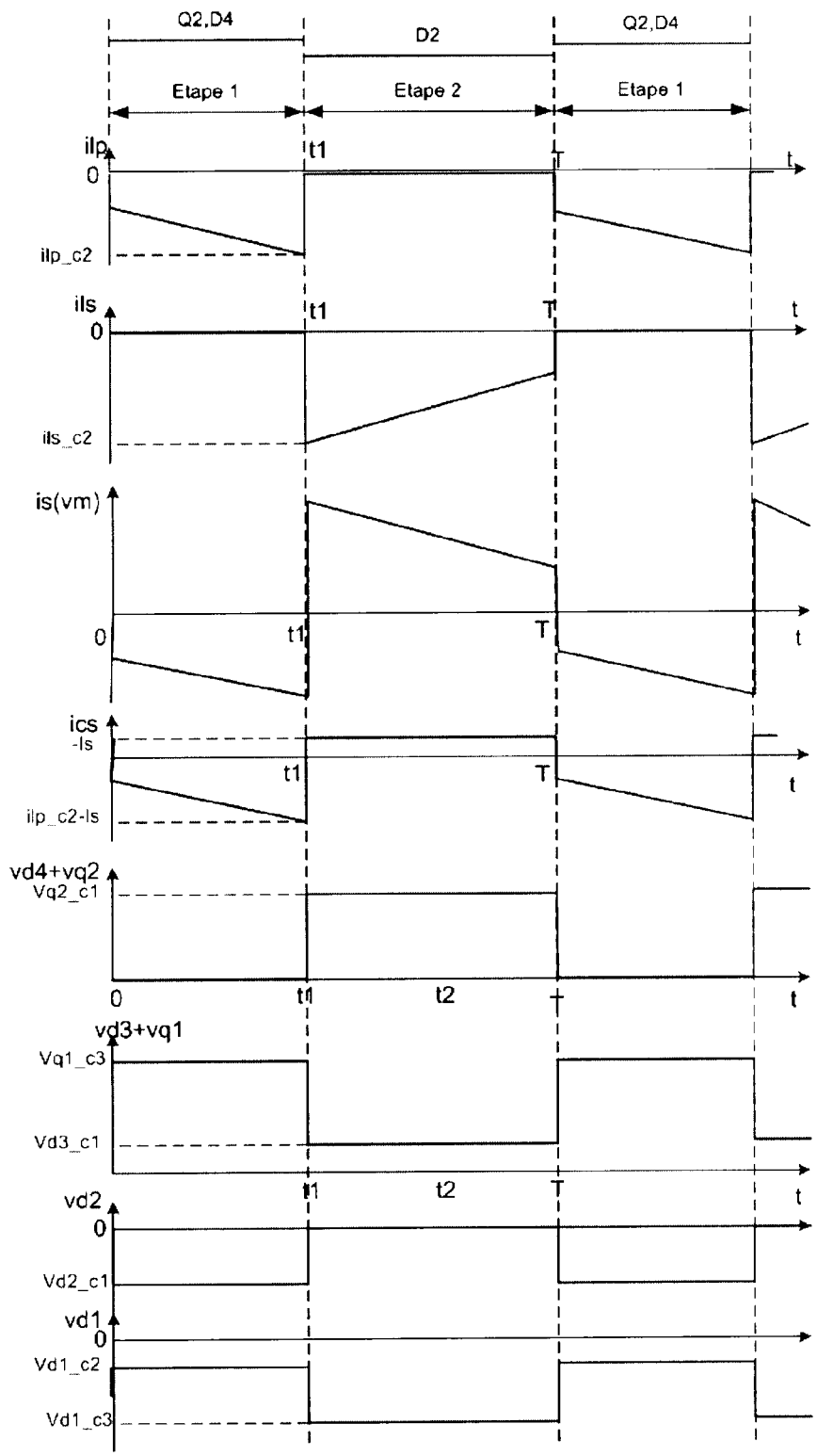

FIG. 5B shows the chronograms corresponding to the operating mode illustrated by FIGS. 4A and 4B for a continuous mode, therefore an operating cycle comprising two steps.

Figure 4D:
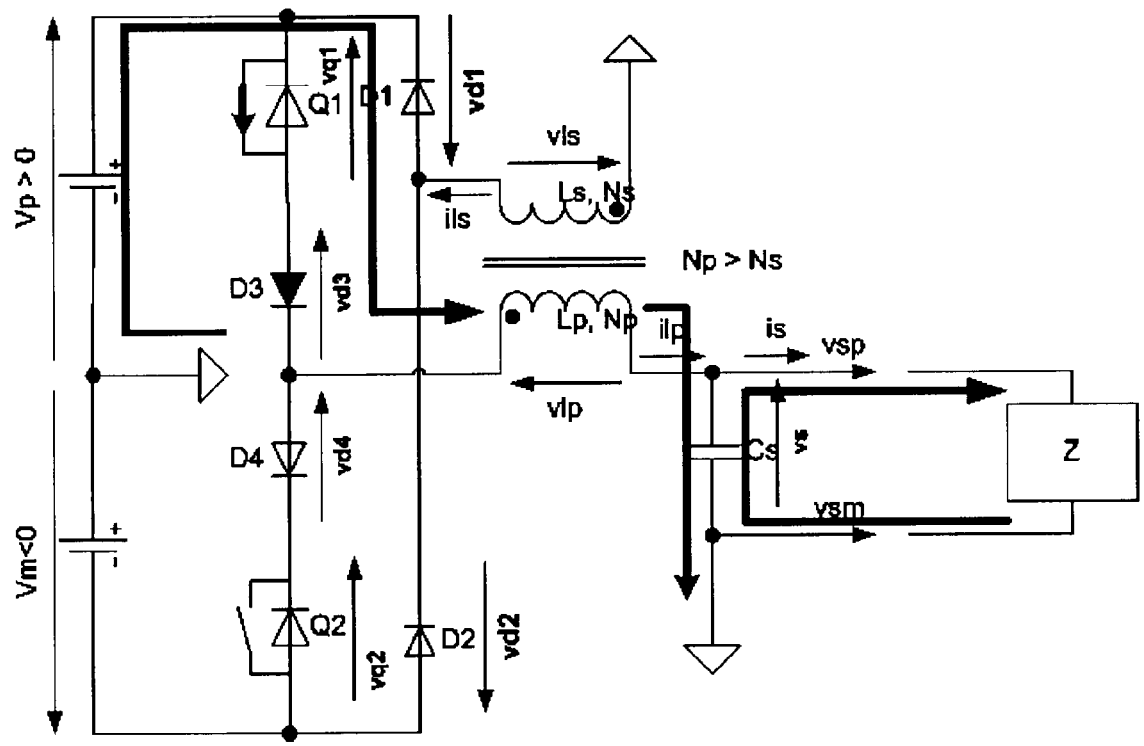
Figure 4E:
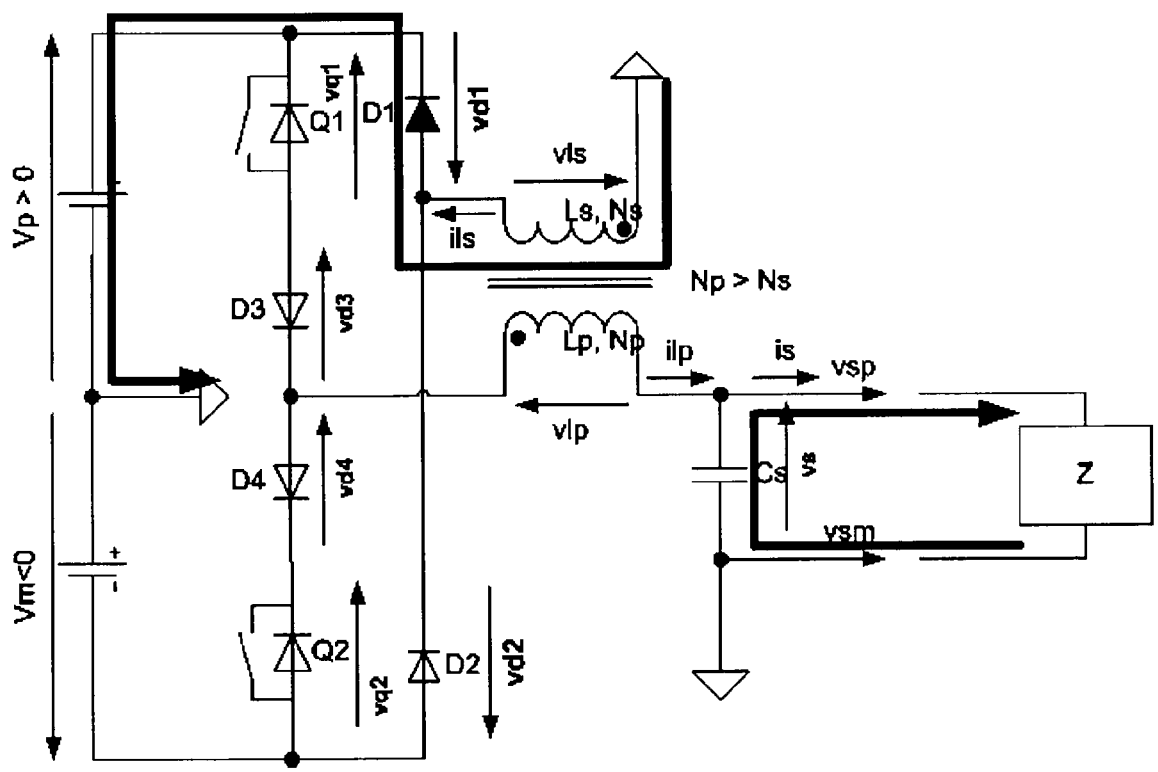
Figure 4F:
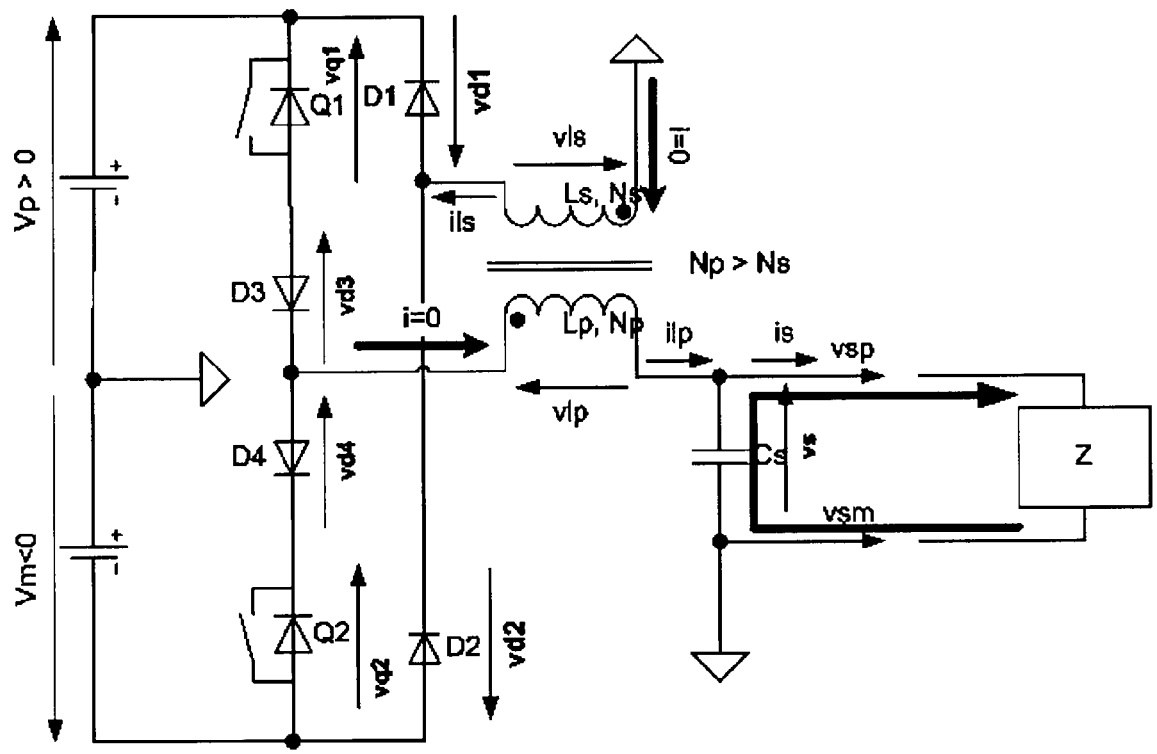

FIGS. 4D to 4F concern an operating mode where the output current "is" is positive, for an operating cycle (from t=0 to t=T).

FIG. 4D illustrates a first step of the operating cycle between the instants t=0 and t=$t_1$ (where $t_1$<T). The circuit may operate in continuous mode and in discontinuous mode. During this step, the command of the circuit is such that:
Q1 and D3 conduct,
Q2, D1, D2 and D4 are blocked.

FIG. 4E illustrates a second step of the operating cycle, between the instants t=$t_1$ and t=$t_2$. The circuit may operate in continuous mode (in this case $t_2$=T) or in discontinuous mode. During this step, the command of the circuit is such that:
D1 conducts,
Q1, Q2, D2, D3 and D4 are blocked.

FIG. 4F illustrates a third step of the operating cycle, uniquely for the discontinuous mode, between t=$t_2$ and t=T. During this step, the command of the circuit is such that:
Q1, Q2, D1, D2, D3 and D4 are blocked,
the current "is" flowing in the load is supplied by the energy accumulated in the capacitor Cs.

Figure 5C:
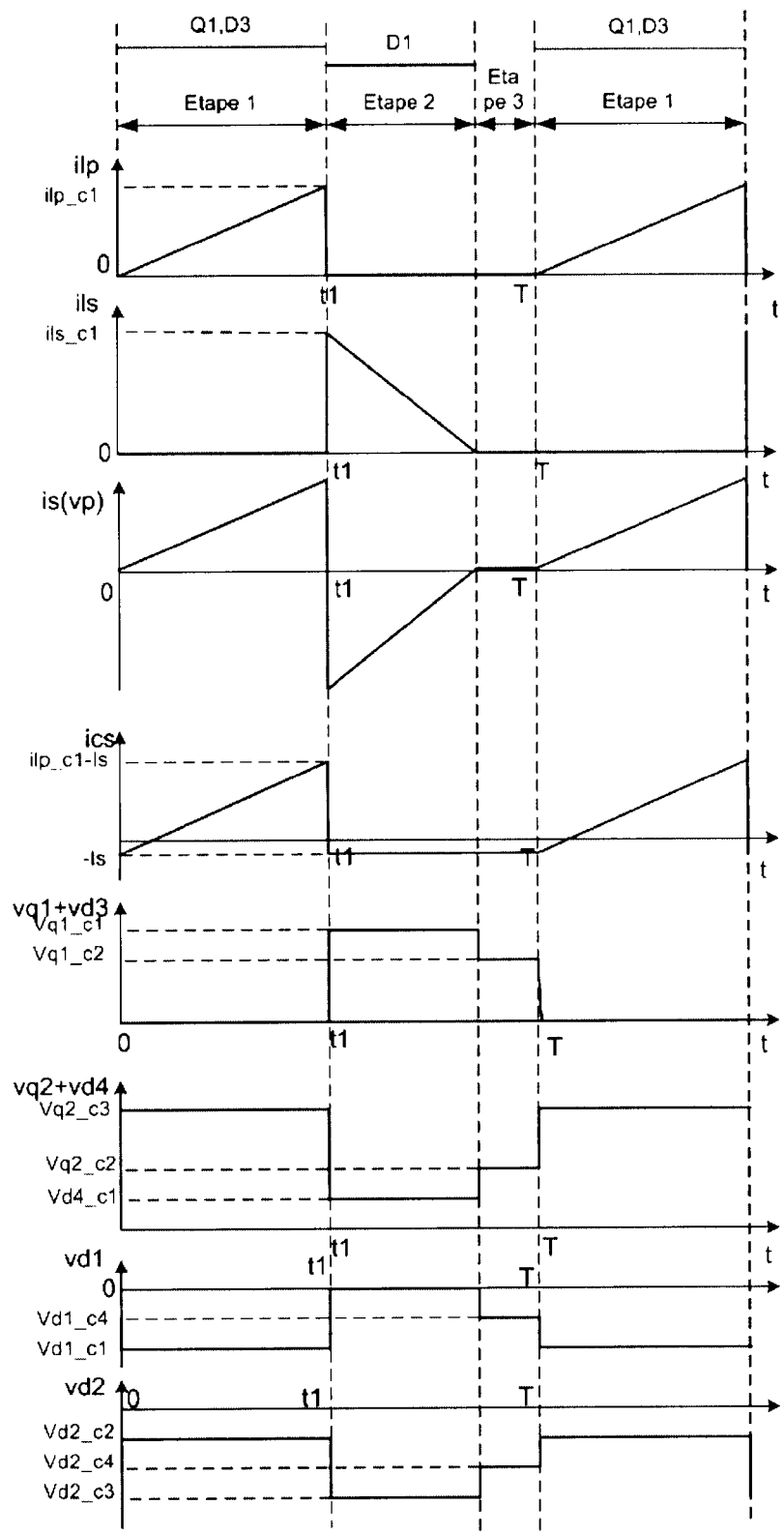

FIG. 5C shows the chronograms corresponding to the operating mode illustrated by FIGS. 4D to 4F for a discontinuous mode, therefore for an operating cycle comprising three steps.

Figure 5D:
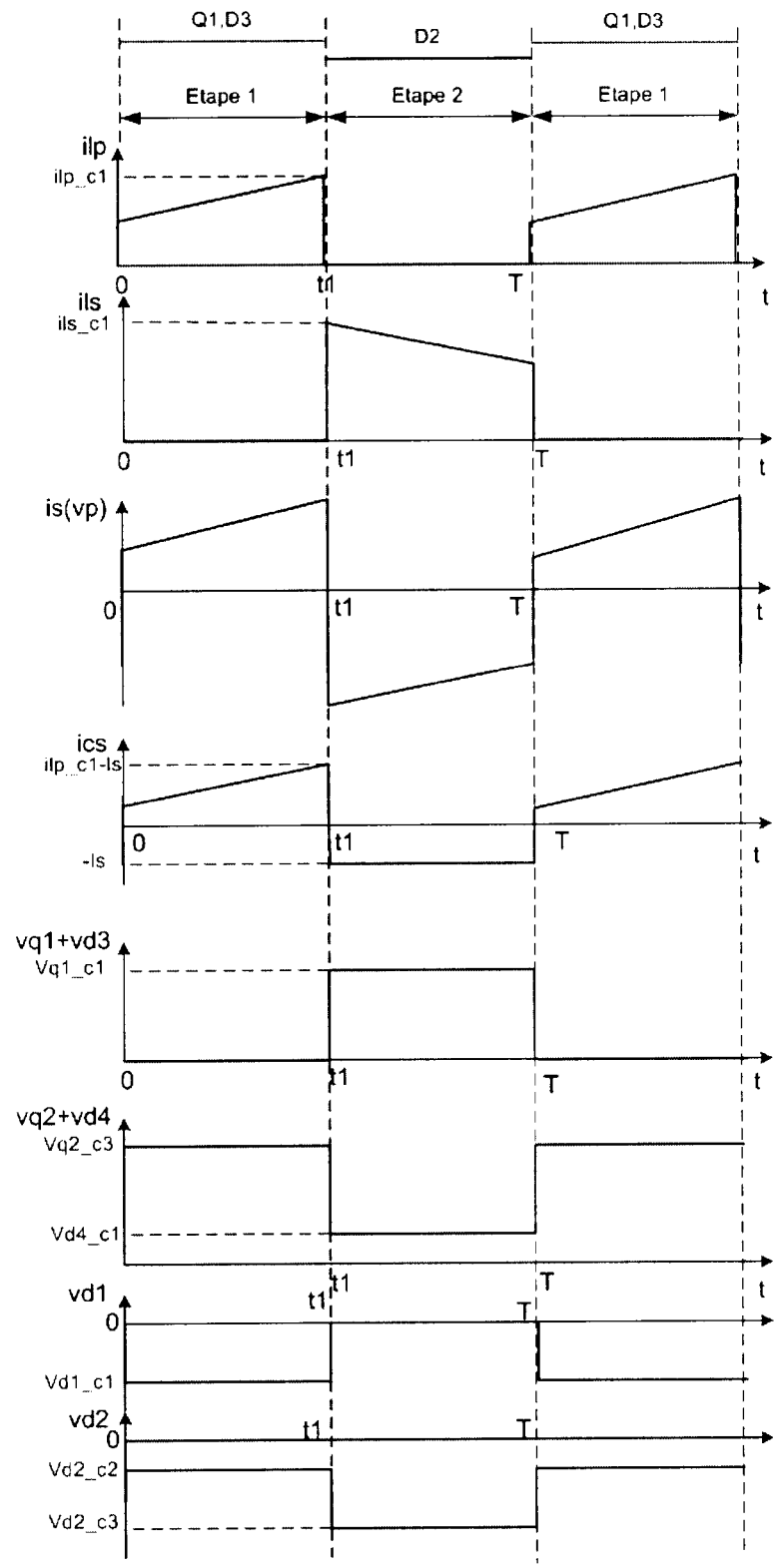

FIG. 5D shows the chronograms corresponding to the operating mode illustrated by FIGS. 4D and 4E for a continuous mode, therefore for an operating cycle comprising two steps.

FIGS. 4G to 4N concern an operating mode where the two transistors Q1 and Q2 (forming switch) conduct when the output current is negative (is<0) and when the output current is positive (is>0). The operation described is in continuous mode.

FIGS. 4G to 4J concern an operating mode where the output current "is" is negative, for an operating cycle (from t=0 to t=T).

Figure 4G:
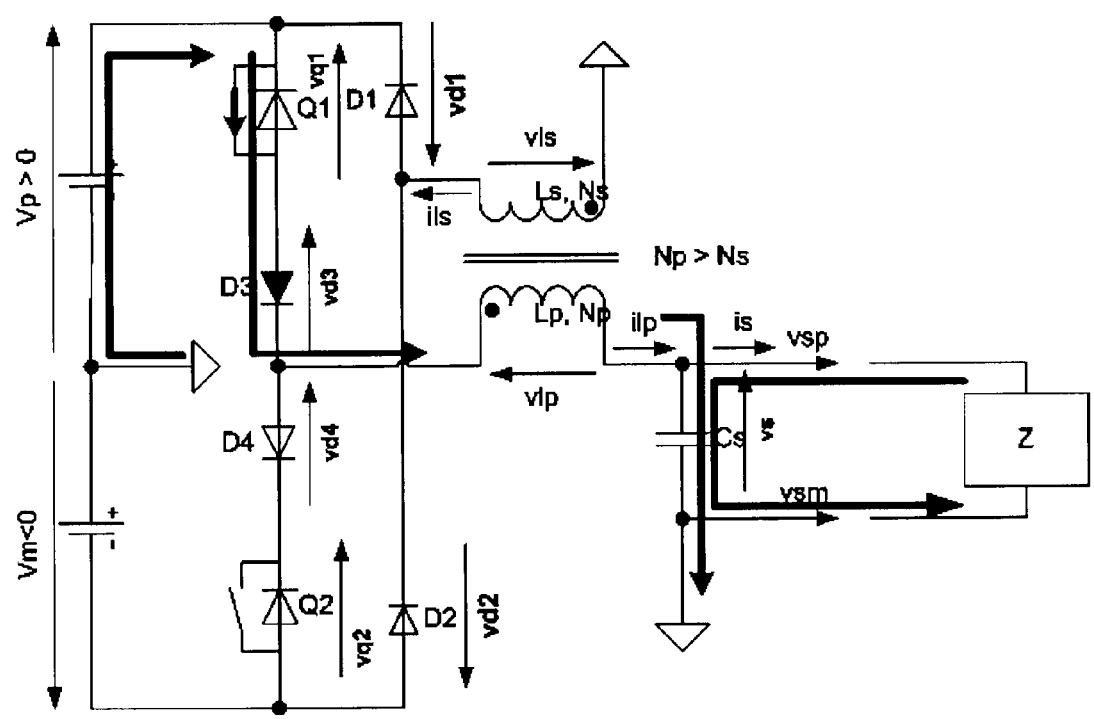

FIG. 4G illustrates a first step of the operating cycle, between the instants t=0 and t=$t_1$. During this step, the control of the circuit is such that:
Q1 and D3 conduct,
Q2, D1 and D4 are blocked,
D2 is blocked if the voltage in output SP with respect to earth is, in absolute value, sufficiently low.

Figure 4H:
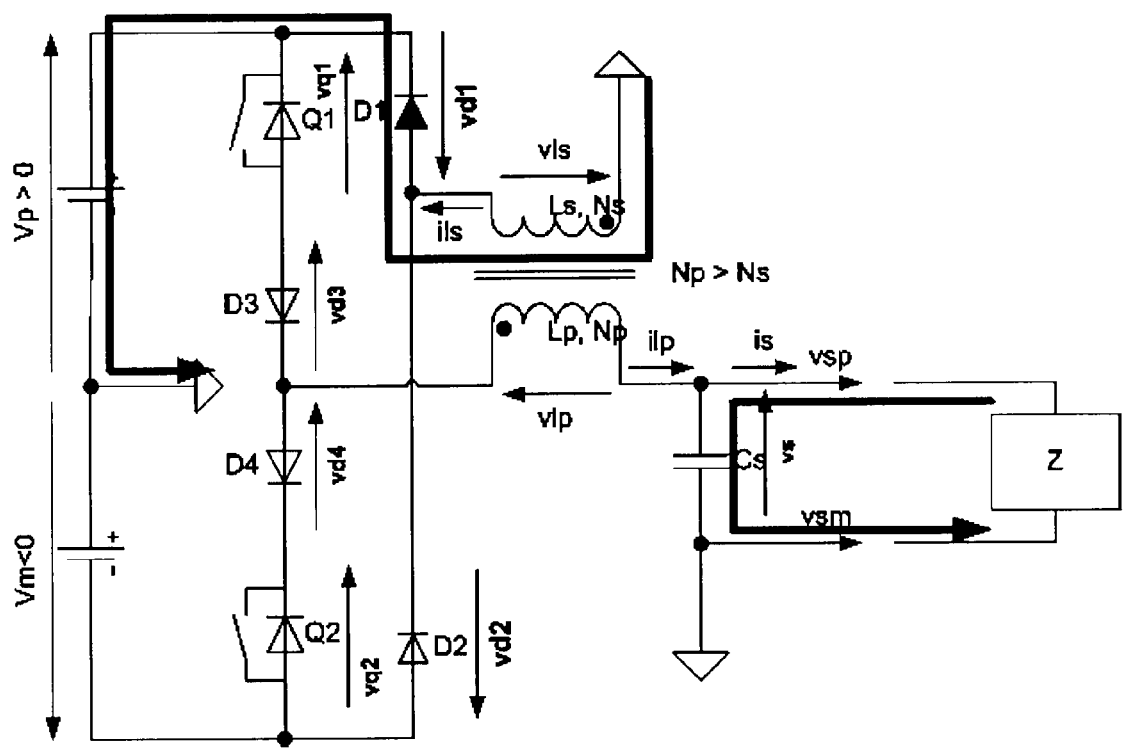

FIG. 4H illustrates a second step of the operating cycle, between the instants t=$t_1$ and t=$t_2$. During this step, the command of the circuit is such that:
D1 conducts,
Q1, Q2, D2, D3 and D4 are blocked.

Figure 4I:
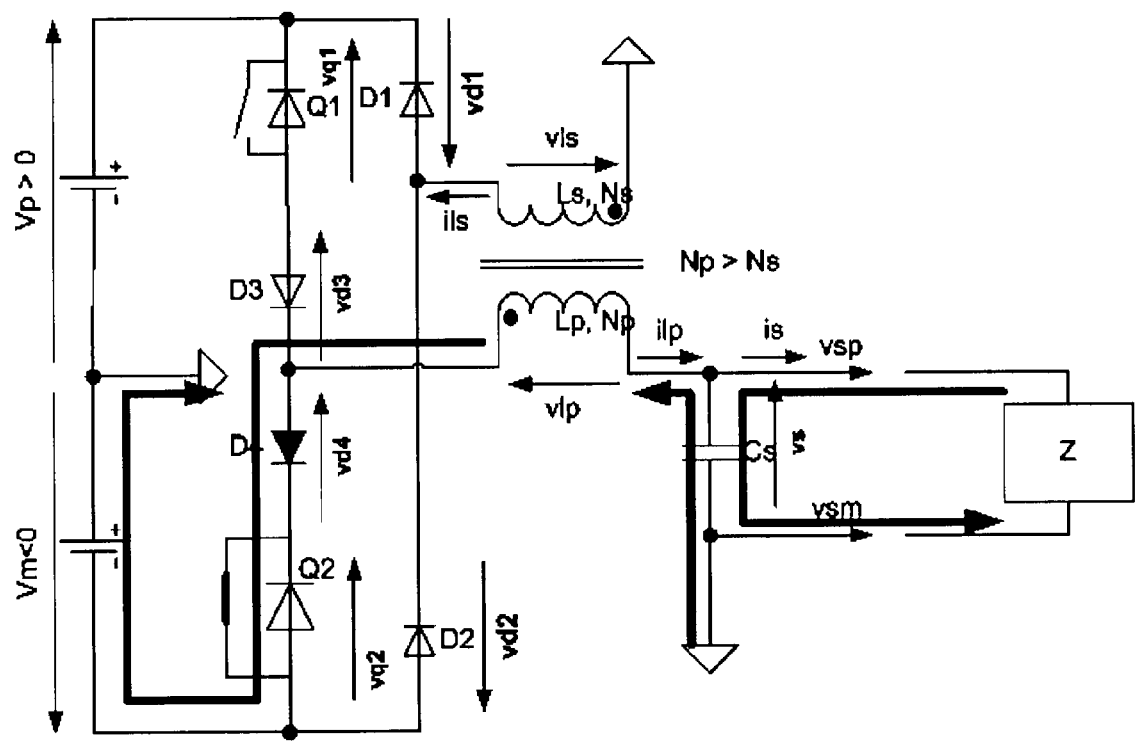

FIG. 4I illustrates a third step of the operating cycle, between the instants t=$t_2$ and t=$t_3$. During this step, the command of the circuit is such that:
Q2 and D4 conduct,
Q1, D1, D2 and D3 are blocked.

Figure 4J:
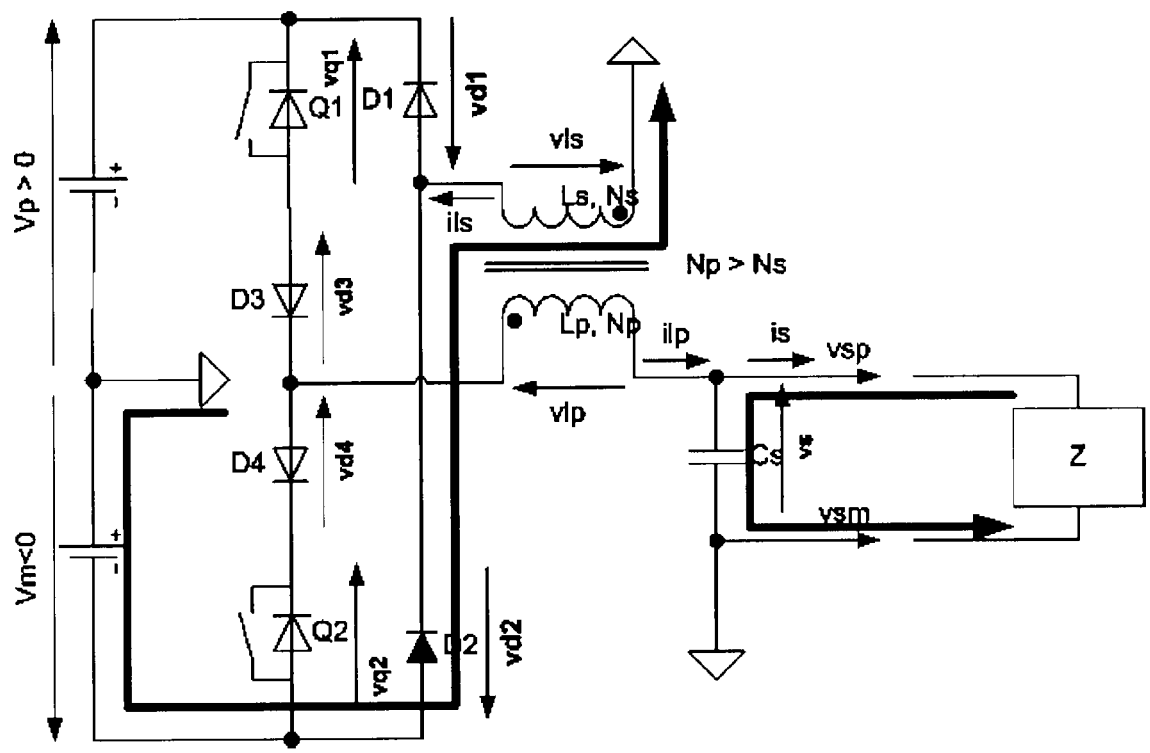

FIG. 4J illustrates a fourth step of the operating cycle, between the instants t=$t_3$ and t=T. During this step, the command of the circuit is such that:
D2 conducts,
Q1, Q2, D1, D3 and D4 are blocked.

FIGS. 4K to 4N concern an operating mode where the output current "is" is positive, for an operating cycle (from t=0 to t=T).

Figure 4K:
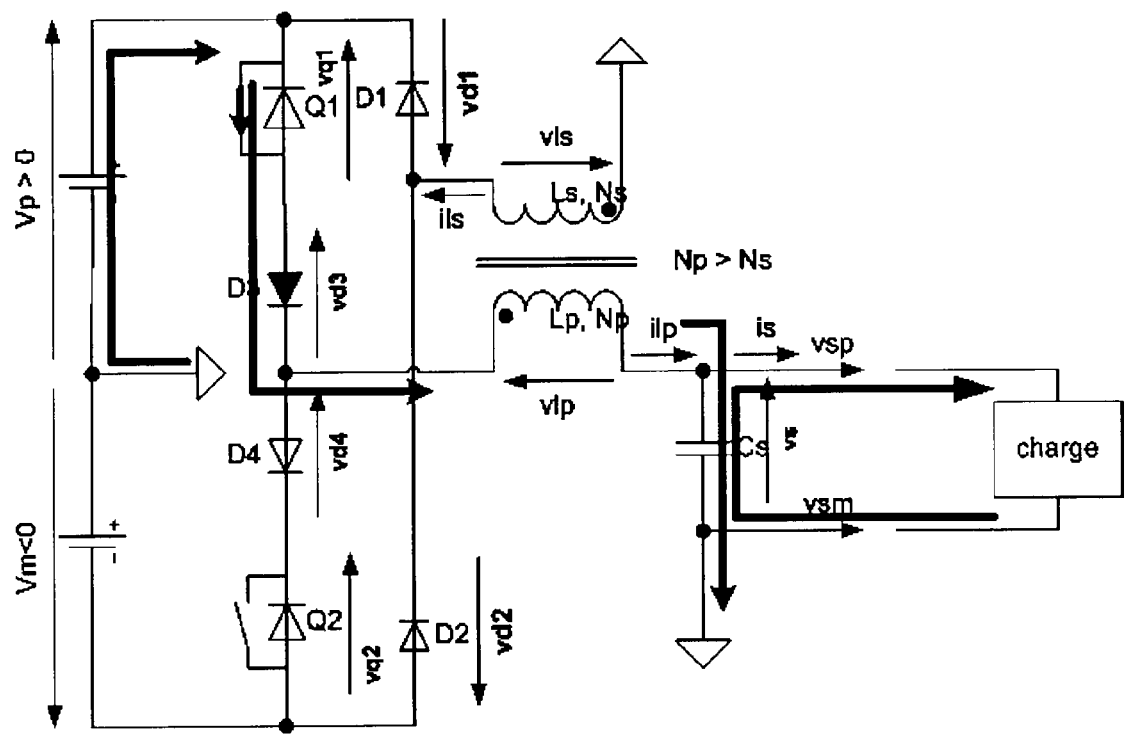

FIG. 4K illustrates a first step of the operating cycle, between the instants t=0 and t=$t_1$. During this step, the command of the circuit is such that:
Q1 and D3 conduct,
Q2, D1, D2 and D4 are blocked.

Figure 4L:
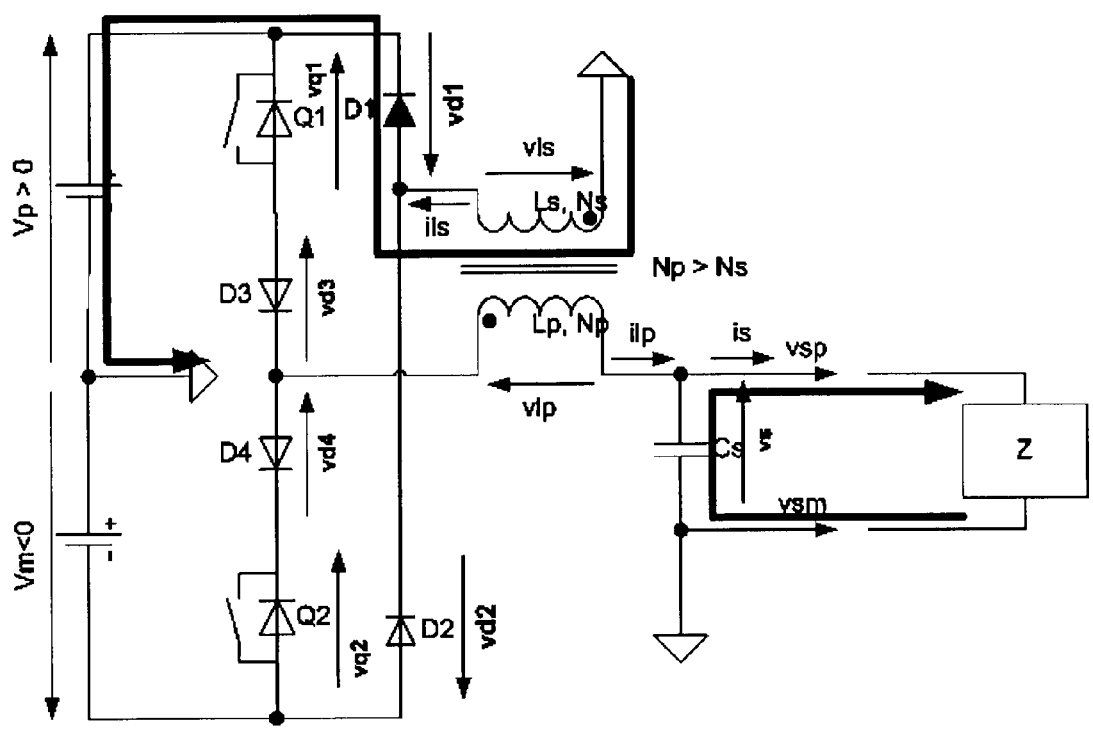

FIG. 4L illustrates a second step of the operating cycle, between the instants t=$t_1$ and t=$t_2$. During this step, the command of the circuit is such that:
D1 conducts,
Q1, Q2, D2, D3 and D4 are blocked.

Figure 4M:
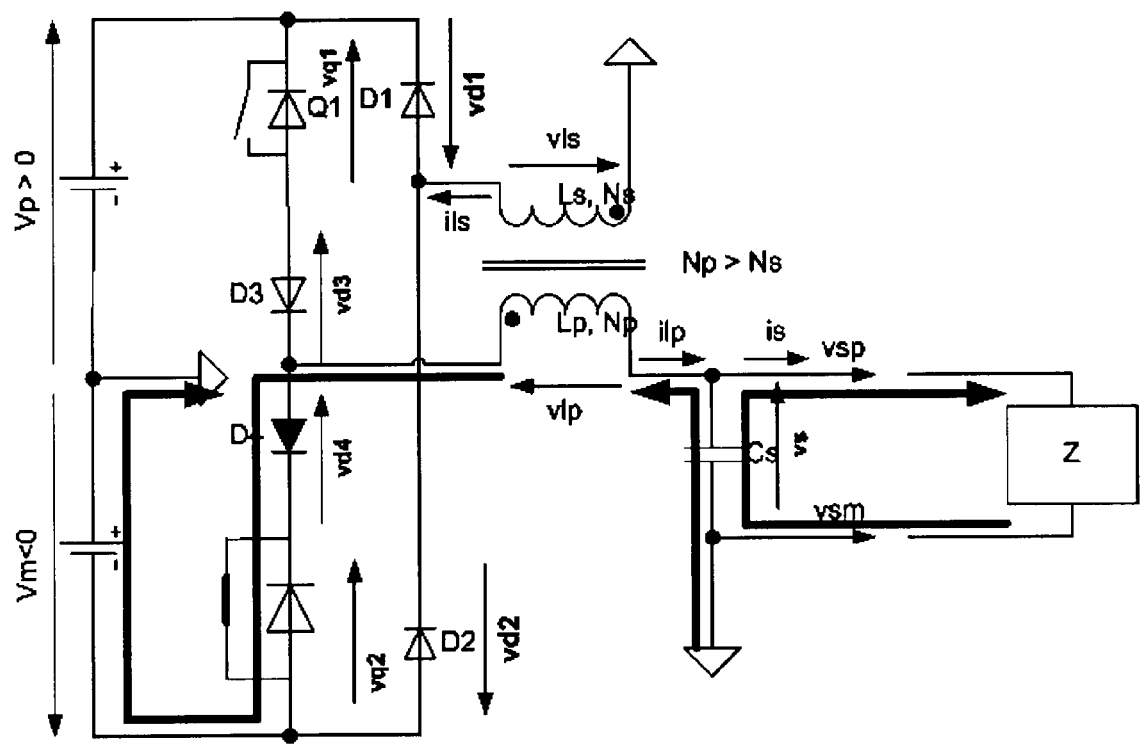

FIG. 4M illustrates a third step of the operating cycle, between the instants t=$t_2$ and t=$t_3$. During this step, the command of the circuit is such that:
Q2 and D4 conduct
Q1, D2 and D3 are blocked,
D1 is blocked if the voltage in output SP with respect to earth is, in absolute value, sufficiently low.

Figure 4N:
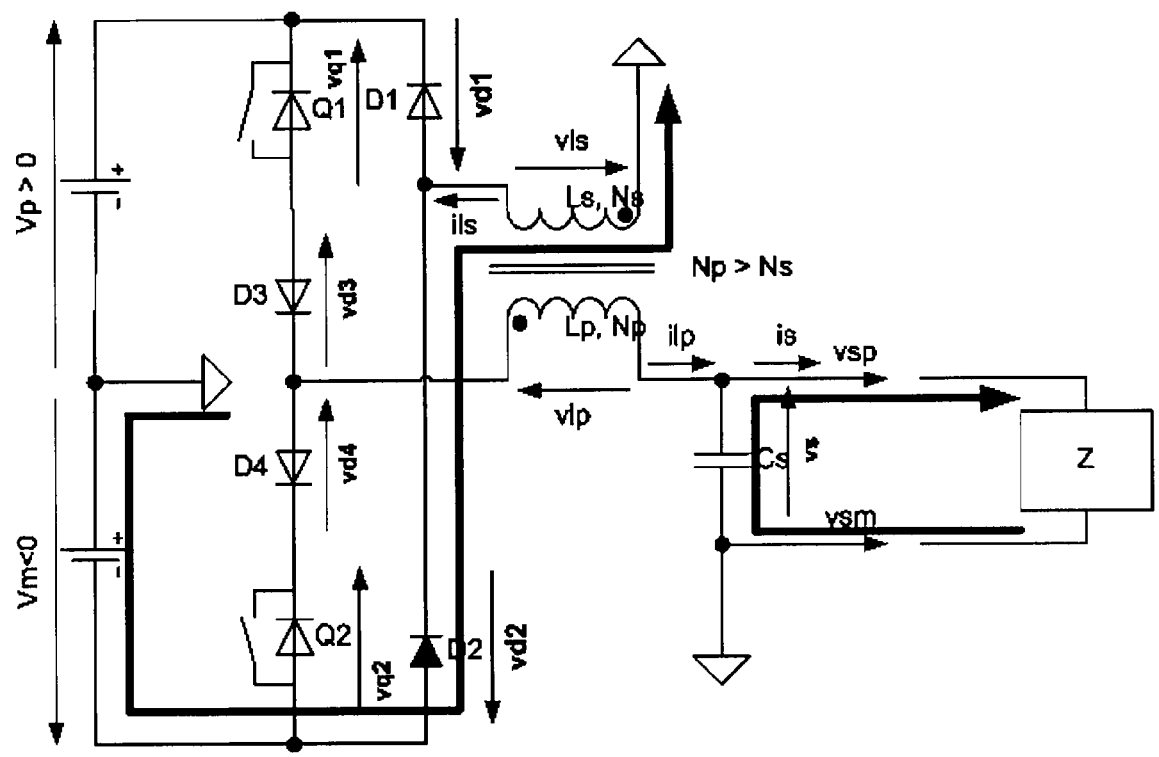

FIG. 4N illustrates a fourth step of the operating cycle, between the instants t=$t_3$ and t=T. During this step, the command of the circuit is such that
D2 conducts,
Q1, Q2, D1, D3 and D4 are blocked.

Figure 5E:
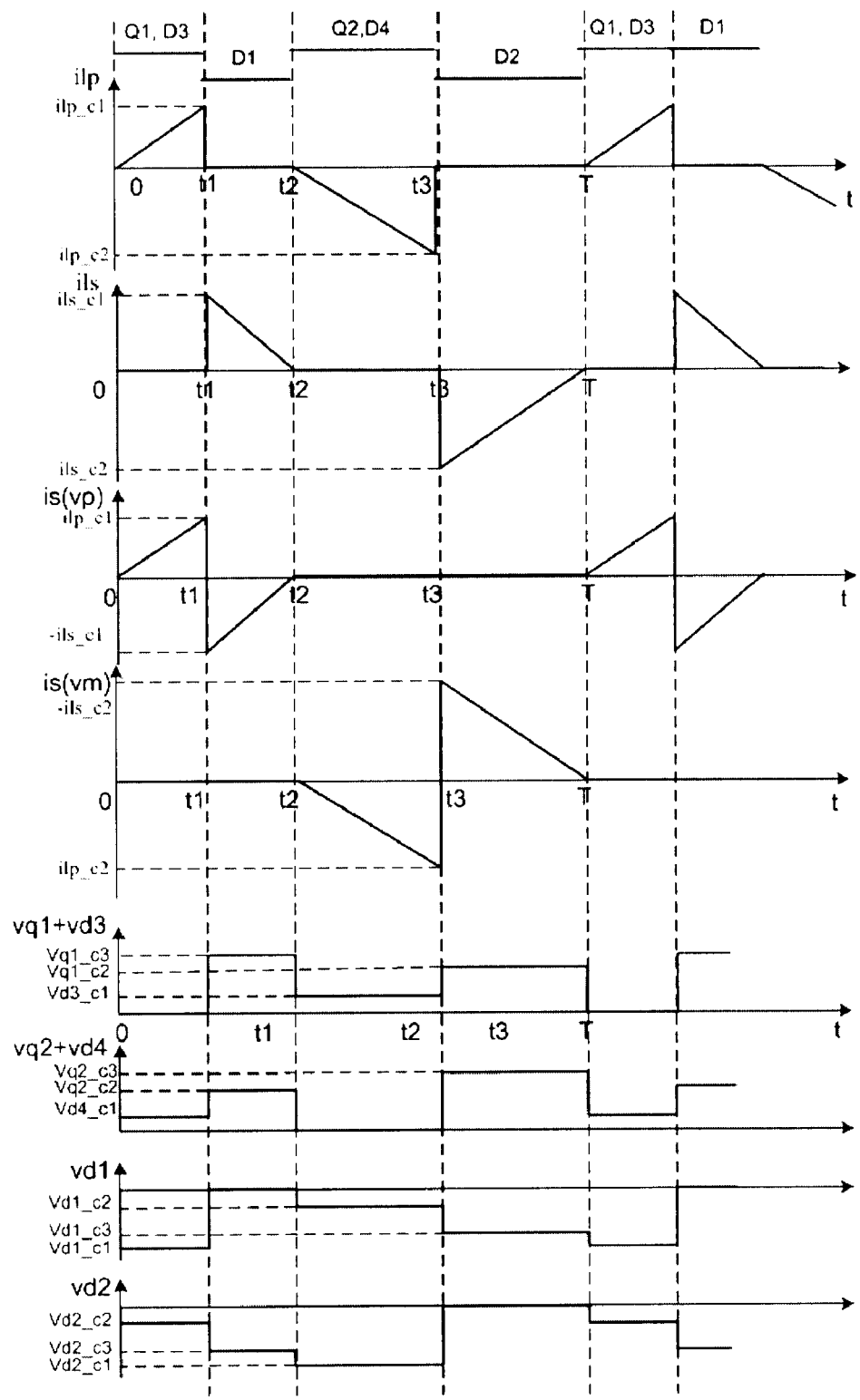

FIG. 5E shows the chronograms corresponding to the operating mode illustrated by FIGS. 4G to 4J, therefore for an operating cycle comprising four steps.

Figure 5F:
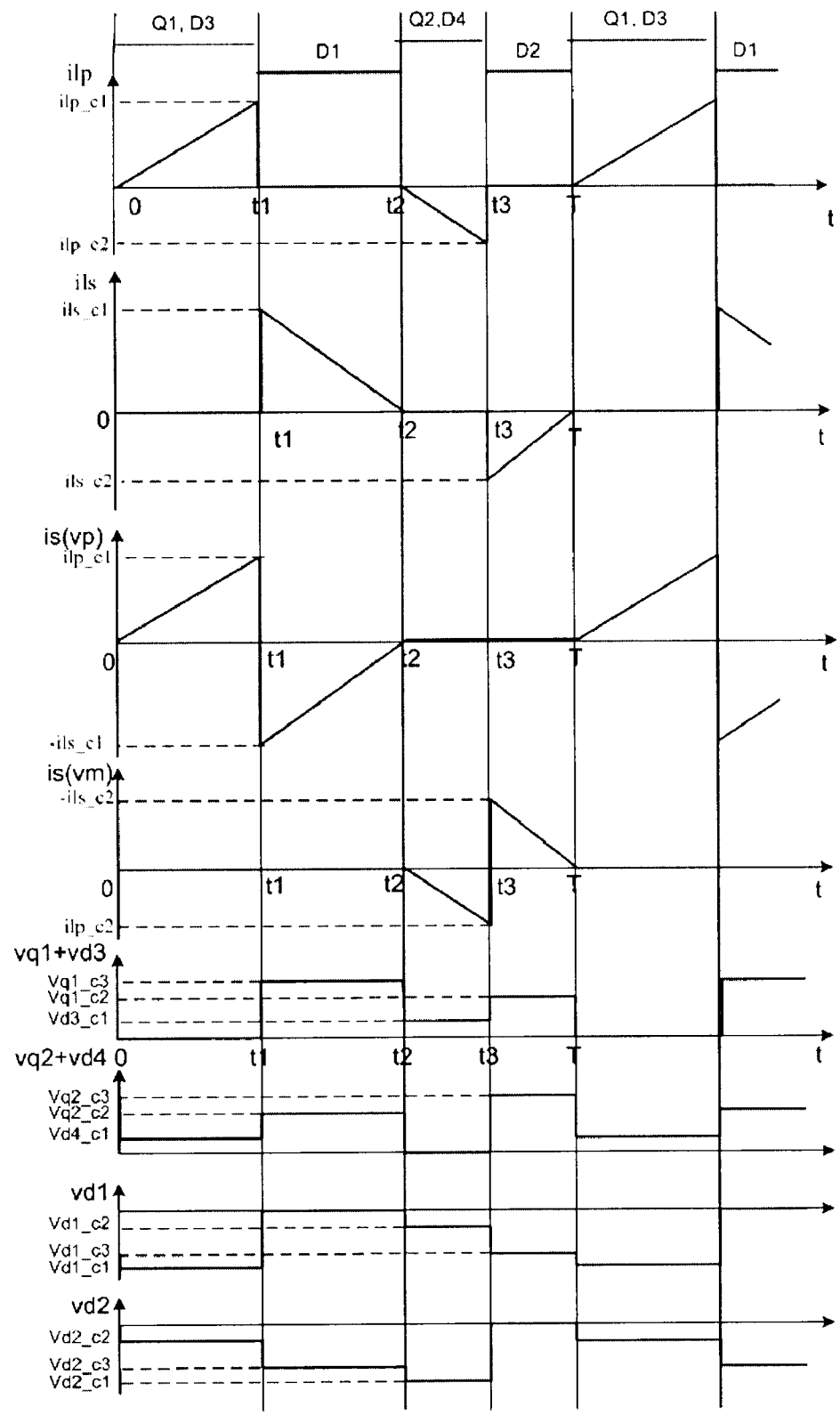

FIG. 5F shows the chronograms corresponding to the operating mode illustrated by FIGS. 4K to 4N, therefore for an operating cycle also comprising four steps.

Figure 6A:
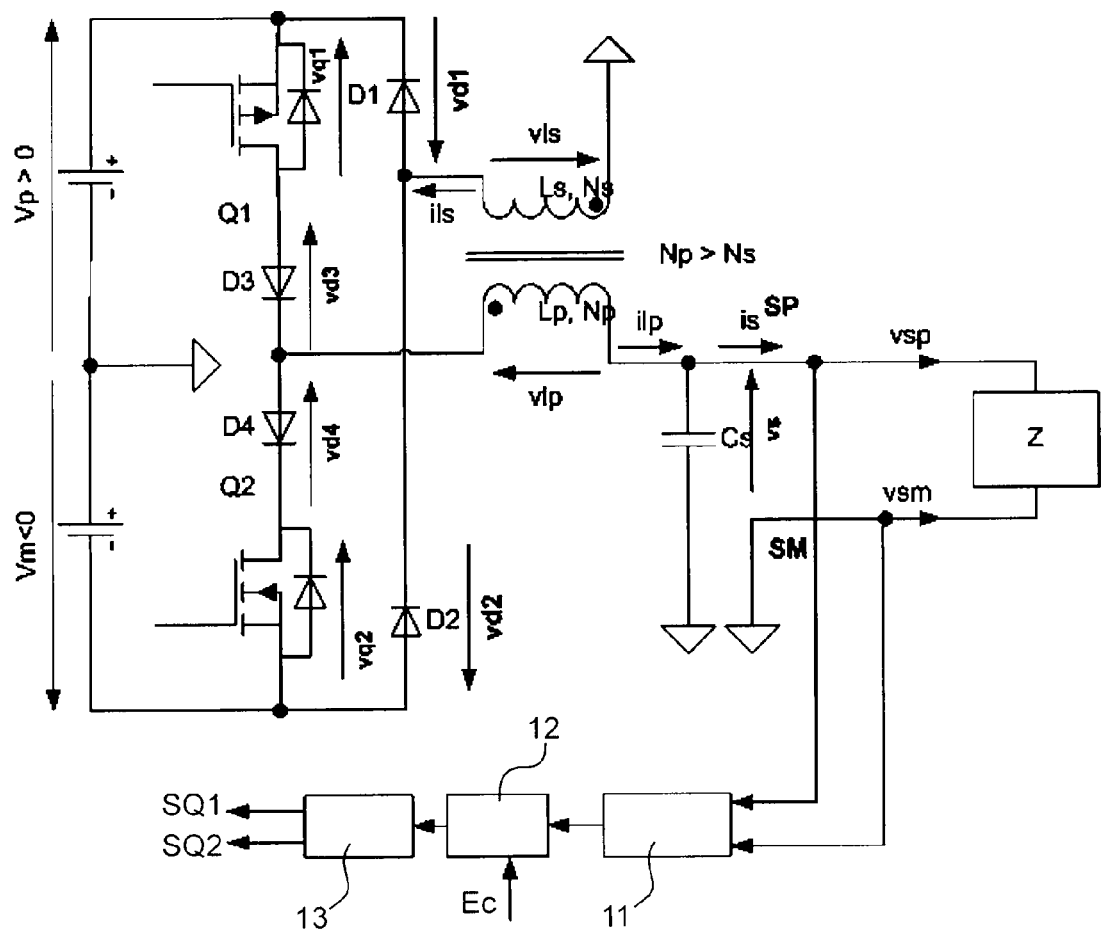
FIG. 6a shows the principle of using the converter according to the invention as voltage source.

FIG. 6a shows the principle of using the converter according to the invention as voltage source by the addition of means 11 of measuring the differential voltage between the outputs SP and SM, a suitable equaliser 12 receiving a set point Ec and a suitable modulator 13. The outputs of the modulator 13 supply the command voltages SQ1 and SQ2 of the transistors Q1 and Q2.

Figure 6B:
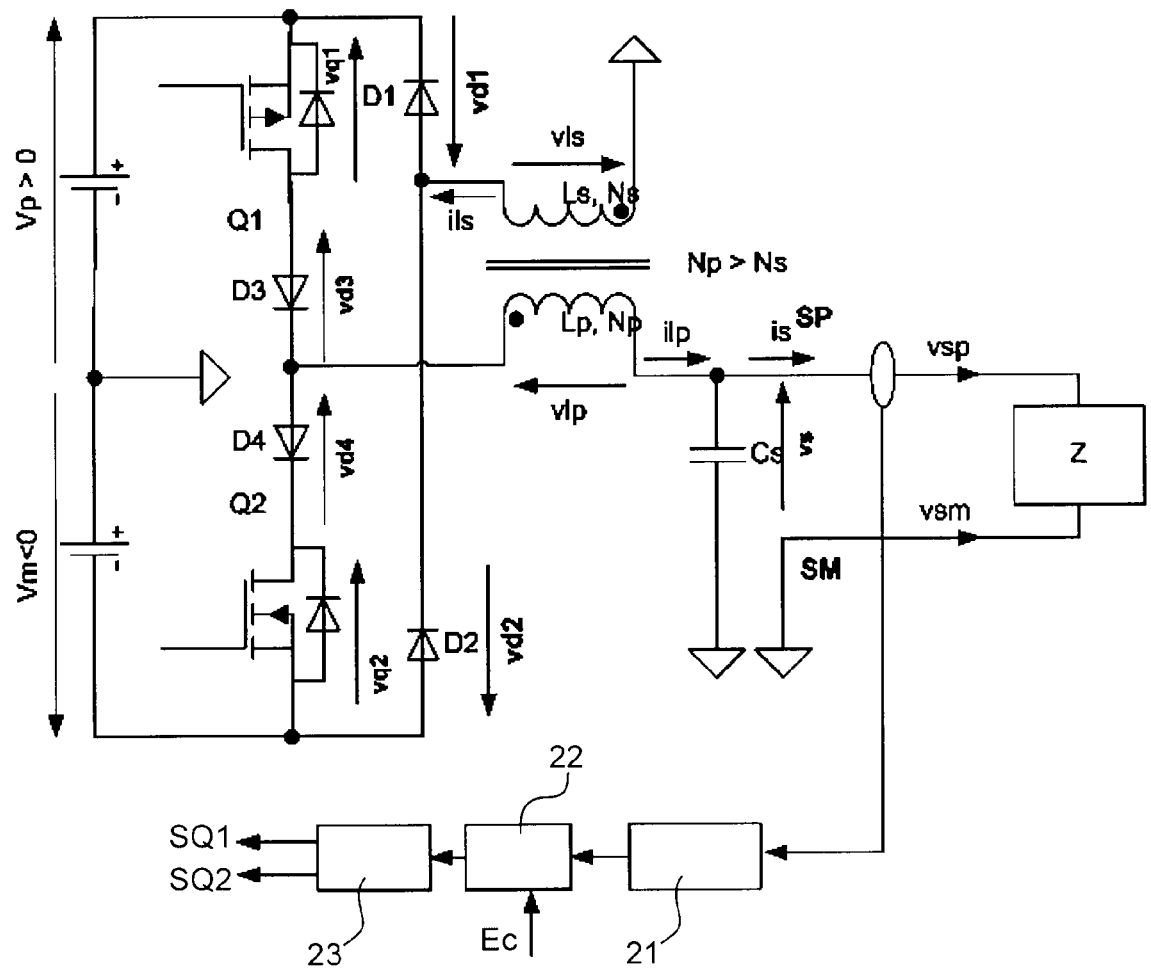
FIG. 6b shows the principle of using the converter according to the invention as current source.

FIG. 6b shows the principle of using the converter according to the invention as current source by the addition of means 21 of measuring "is" output currents of the converter, a suitable equaliser 22 receiving a set point Ec and a suitable modulator 23. The outputs of the modulator 23 supply the command voltages SQ1 and SQ2 of the transistors Q1 and Q2.

The invention claimed is:

1. A chopping converter supplied by a positive voltage (Vp) and a negative voltage (Vm) with respect to ground, and delivering an output voltage between a first output terminal (SP) and a second output terminal (SM), the latter terminal being connected directly to ground or through a resistor, comprising two windings (Ls, Lp) wound in opposition around a magnetic core, the number of turns of the second winding (Lp) being greater than the number of turns of the first winding (Ls), the first end of the first winding (Ls) being connected to a mid point of a first branch connecting the positive voltage (Vp) to the negative voltage (Vm) and comprising a first diode (D1) and a second diode (D2) inversely mounted, the mid point of the first branch being situated between the first diode (D1) and the second diode (D2), the second end of the first winding (Ls) being connected to ground, the first end of the second winding (Lp) being connected to a mid point of a second branch connecting the positive voltage (Vp) to the negative voltage (Vm), the part of the second branch connecting its mid point to the positive voltage (Vp) comprising, arranged in series, a first switch forming means (Q1) and a third diode (D3) directly mounted in relation to the positive voltage (Vp) and together forming a unidirectional switch with direct and inverse blocking capability, the part of the second branch connecting its mid point to the negative voltage (Vm) comprising, arranged in series, a second switch forming means (Q2) and a fourth diode (D4) directly mounted in relation to the negative voltage (Vm) and together forming a unidirectional switch with direct and inverse blocking capability, the second end of the second winding (Lp) being connected to the output terminal (S).

2. A chopping converter according to claim 1, in which a smoothing capacitor (Cs) is connected between the first output terminal (SP) of the converter and ground.

3. A chopping converter according to claim 1, in which, in the second branch connecting the positive voltage (Vp) to the negative voltage (Vm), said arrangement in series includes arranging the first (Q1) and second (Q2) switch forming means on the side of the respective positive or negative voltages and arranging the third (D3) and fourth (D4) diodes on the side of the mid point of the second branch.

4. A chopping converter according to claim 1, in which the first (Q1) and second (Q2) switch forming means are chosen among MOS transistors, bipolar transistors and IGBT transistors or any other switch having a bidirectional conduction capability and a direct blocking capability.

5. A chopping converter according to claim 1, further comprising means of measuring the output voltage of the converter, this measuring means delivering an output signal representative of the output voltage to a first input of a regulation means in which a second input receives a set point signal, the regulation means delivering a signal supplied to the input of a modulator in which a first output sends a command signal (SQ1) to the first switch forming means (Q1) and in which a second output sends a command signal (SQ2) to the second switch forming means (Q2), the converter being thereby configured in voltage source.

6. A chopping converter according to claim 1, further comprising means of measuring the output current (is) of the converter, this measuring means delivering an output signal representative of the output current of the converter to a first input of a regulation means in which a second input receives a set point signal, the regulation means delivering a signal supplied to the input of a modulator in which a first output sends a command signal (SQ1) to the first switch forming means (Q1) and in which a second output sends a command signal (SQ2) to the second switch forming means (Q2), the converter being configured in current source.

7. An electromechanical actuator control comprising a chopping converter according to claim 1.

8. A regulating automaton comprising a chopping converter according to claim 1.

9. A terrestrial, naval or aeronautic equipment comprising a chopping converter according to claim 1.

10. A turbine engine comprising a chopping converter according to claim 1.

11. A method for operating a chopping converter according to claim 1, the converter being supplied by a positive voltage (Vp) and a negative voltage (Vm) with respect to ground, the converter delivering an output current (is) in a load (Z) connected between the first output terminal (SP) and the second output terminal (SM), the method comprising the following steps, for an operating cycle and to pass a negative current in the load (Z):

a first step during which a first switch forming means (Q1) are open, the fourth diode (D4) is conducting, the second switch forming means (Q2) are closed and the first (D1), second (D2) and third (D3) diodes are blocked during a first part of the cycle, the converter operating in continuous mode or in discontinuous mode, a second step, following the first step, during which, the first (Q1) and second (Q2) switch forming means are open, the second diode (D2) is conducting and the first (D1), third (D3) and fourth (D4) diodes are blocked during a second part of the cycle, this second part of the cycle not ending the cycle if the converter operates in discontinuous mode and ending the cycle if the converter operates in continuous mode, a third step, following the second step if the converter operates in discontinuous mode, during which the first (Q1) and second (Q2) switch forming means are open and the first (D1), second (D2), third (D3) and fourth (D4) diodes are blocked during a third part of the cycle ending at the end of the cycle.

12. A method for operating a chopping converter according to claim 1, supplied by a positive voltage (Vp) and a negative voltage (Vm) with respect to ground, the converter delivering an output current (is) in a load (Z) connected between the first output terminal (SP) and the second output terminal (SM), the method comprising the following steps, for an operating cycle and to pass a positive current in the load (Z):

a first step during which a first switch forming means (Q1) are closed, the third diode (D3) is conducting, the second switch forming means (Q2) are open and the first (D1), second (D2) and fourth (D4) diodes are blocked during a first part of the cycle, the converter operating in continuous mode or in discontinuous mode, a second step, following the first step, during which the first diode (D1) is conducting, the first (Q1) and second (Q2) switch forming means are open and the second (D2), third (D3) and fourth (D4) diodes are blocked during a second part of the cycle, this second part of the cycle not ending the cycle if the converter operates in discontinuous mode and ending the cycle if the converter operates in continuous mode, a third step, following the second step if the converter operates in discontinuous mode, during which the first (Q1) and second (Q2) switch forming means are open, the first (D1), second (D2), third (D3) and fourth (D4) diodes are blocked, during a third part of the cycle ending at the end of the cycle.

13. A method for operating a chopping converter according to claim 1, supplied by a positive voltage (Vp) and a negative voltage (Vm) with respect to ground, the converter delivering an output current (is) in a load (Z) connected between the first output terminal (SP) and the second output terminal (SM), the method comprising the following steps, for an operating cycle and to pass a negative current in the load (Z), the converter operating in continuous mode:
   a first step during which a first switch forming means (Q1) are closed, the third diode (D3) is conducting, the second switch forming means (Q2) are open and the first (D1) and fourth (D4) diodes are blocked, the second diode (D2) being blocked if the voltage to the first output (SP) with respect to ground is, in absolute value, sufficiently low during a first part of the cycle,
   a second step, following the first step, during which the first diode (D1) is conducting, the first (Q1) and second (Q2) switch forming means are open and the second (D2), third (D3) and fourth (D4) diodes are blocked during a second part of the cycle,
   a third step, following the second step, during which the second switch forming means (Q2) are closed, the fourth diode (D4) is conducting, a first switch forming means (Q1) are open and the first (D1), second (D2) and third (D3) diodes are blocked, during a third part of the cycle,
   a fourth step, following the third step, during which the second diode (D2) is conducting, the first (Q1) and second (Q2) switch forming means are open and the first (D1), third (D3) and fourth (D4) diodes are blocked, during a fourth part of the cycle ending at the end of the cycle.

14. A method for operating a chopping converter according to claim 1, the converter being supplied by a positive voltage (Vp) and a negative voltage (Vm) with respect to ground, the converter delivering an output current (is) in a load (Z) connected between the first output terminal (SP) and the second output terminal (SM), the method comprising the following steps, for an operating cycle and to pass a positive current in the load (Z), the converter operating in continuous mode:
   a first step during which a first switch forming means (Q1) are closed, the third diode (D3) is conducting, the second switch forming means (Q2) are open, the first (D1), second (D2) and fourth (D4) diodes are blocked during a first part of the cycle,
   a second step, following the first step, during which the first diode (D1) is conducting, the first (Q1) and second (Q2) switch forming means are open and the second (D2), third (D3) and fourth (D4) diodes are blocked during a second part of the cycle,
   a third step, following the second step, during which the second switch forming means (Q2) are closed, the fourth diode (D4) is conducting, a first switch forming means (Q1) are open, the second (D2) and third (D3) diodes are blocked, the first diode (D1) is blocked if the voltage to the first output (SP) with respect to ground is, in absolute value, sufficiently low, during a third part of the cycle,
   a fourth step, following the third step, during which the second diode (D2) is conducting, the first (Q1) and second (Q2) switch forming means are open and the first (D1), third (D3) and fourth (D4) diodes are blocked, during a fourth part of the cycle ending at the end of the cycle.

* * * * *